(12) United States Patent
Pons et al.

(10) Patent No.: US 8,463,955 B2
(45) Date of Patent: Jun. 11, 2013

(54) TRANSPORT FRAME STRUCTURE FOR RETRANSMISSION IN DSL

(75) Inventors: Julien D. Pons, Metuchen, NJ (US); Massimo Sorbara, Freehold, NJ (US); Laurent Francis Alloin, Monmouth Beach, NJ (US); Ravindra M. Lambi, Old Bridge, NJ (US)

(73) Assignee: Ikanos Communications, Inc., Fremont, CA (US)

( * ) Notice: Subject to any disclaimer, the term of this patent is extended or adjusted under 35 U.S.C. 154(b) by 328 days.

(21) Appl. No.: 12/645,753

(22) Filed: Dec. 23, 2009

(65) Prior Publication Data

US 2010/0185791 A1 Jul. 22, 2010

Related U.S. Application Data

(60) Provisional application No. 61/145,680, filed on Jan. 19, 2009.

(51) Int. Cl.
*G06F 3/00* (2006.01)

(52) U.S. Cl.
USPC .......................................................... 710/30

(58) Field of Classification Search
USPC .......................................................... 710/30
See application file for complete search history.

(56) References Cited

U.S. PATENT DOCUMENTS

| 6,598,200 | B1 | 7/2003 | Greenwood et al. |
| 7,013,418 | B1 | 3/2006 | Revsin et al. |
| 2008/0062872 | A1 | 3/2008 | Christiaens et al. |

OTHER PUBLICATIONS

International Search Report and Written Opinion for PCT/US2010/020076. Feb. 25, 2010.

*Primary Examiner* — Chun-Kuan Lee
(74) *Attorney, Agent, or Firm* — Mark J. Danielson; Pillsbury Winthrop Shaw Pittman LLP

(57) ABSTRACT

Included are embodiments for retransmission in a digital subscriber line environment. At least one embodiment of a method includes framing data into transport frames, each transport frame carrying payload data that is viewed differently according to the computing layer in which it is transported; transporting the transport frames over a first computing layer, the payload data of each transport frame corresponding to an integer number Q of elementary cells of the first computing layer, an integer number of header bytes containing information specific to the transport frame, and an integer number of padding bytes; and transporting the transport frames over a second computing layer, the payload data content of each transport frame corresponding to payload data of an integer number M of elementary cells of the second computing layer.

23 Claims, 9 Drawing Sheets

TRANSPORT FRAME STRUCTURE FOR RETRANSMISSION IN DSL

CROSS REFERENCE

This application claims priority to U.S. provisional application entitled, "Systems and Methods for Retransmission with ADSL2 Using ATM-TC," having Ser. No. 61/145,680, filed Jan. 19, 2009, which is entirely incorporated herein by reference.

Also incorporated by reference are U.S. application Ser. No. 12/573,742, filed Oct. 5, 2009, entitled "Packet Retransmission Method for DSL Systems" and U.S. application Ser. No. 12/620,832 (Now U.S. Pat. No. 8,413,000), filed Nov. 18, 2009, entitled "Retransmission above the Gamma Interface."

BACKGROUND

In asymmetric digital subscriber line (ADSL) and very high speed digital subscriber line (VDSL) environments, a retransmission (ReTx) technique may be utilized for ensuring quality of transmission for latency-insensitive data, such as video.

The retransmission scheme used in xDSL systems supports (with small variations) both asynchronous transfer mode (ATM) and packet transfer mode (PTM) protocols and has been designed such that elementary frames that can be retransmitted are formed in the physical layer (PHY). It is also proposed that for ADSL, retransmission is only used for the downlink, whereas for VDSL, retransmission can be used either for the downlink only or for both uplink and downlink.

A transmitter supporting the retransmission scheme implements a retransmission queue for storage of elementary frames in order to have access to previously sent elementary frames in the event that a request for retransmission is received. A receiver supporting retransmission scheme implements a rescheduling queue that resequences elementary frames in the event that elementary frames are received out of order due to retransmission.

Management of the retransmission queue (at the transmitter) and the rescheduling queue (at the receiver) can be done in various layers of the xDSL PHY, including the transport protocol specific transmission convergence (TPS-TC) layer and the physical media specific transmission convergence (PMS-TC) layer. However, existing retransmission techniques proposed so far assume that both retransmission queue and rescheduling queue are implemented in the same layer.

SUMMARY

Included are embodiments for retransmission in a digital subscriber line environment. At least one embodiment of a method includes framing data into transport frames, each transport frame carrying payload data that is viewed differently according to the computing layer in which it is transported; transporting the transport frames over a first computing layer, the payload data of each transport frame corresponding to an integer number Q of elementary cells of the first computing layer, an integer number of header bytes containing information specific to the transport frame, and an integer number of padding bytes; and transporting the transport frames over a second computing layer, the payload data content of each transport frame corresponding to payload data of an integer number M of elementary cells of the second computing layer.

Also included are embodiments of a system. At least one embodiment of a system includes a transmitter side device that includes: a first computing layer transporting first layer transport frames, the first layer transport fames including payload data, the payload data of each transport frame corresponding to an integer number Q of elementary cells of the first computing layer, an integer number of header bytes containing information specific to the transport frame, and an integer number of padding bytes, and a second computing layer transporting second format transport frames, the payload data content of each second format transport frame corresponding to an integer number M of elementary cells of the second computing layer, Other systems, methods, features, and advantages of this disclosure will be or become apparent to one with skill in the art upon examination of the following drawings and detailed description. It is intended that all such additional systems, methods, features, and advantages be included within this description and be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

Included herein are embodiments that define a transparent transport structure for a retransmission scheme in xDSL that allows management of the rescheduling queue (at the receiver) either in the PMS-TC layer or the TPS-TC layer independently of the location (PMS-TC or TPS-TC) of the management of the retransmission queue at the transmitter. This means an xDSL modem that performs retransmission with a queue management in the PMS-TC layer can support retransmission with a modem that performs management in the TPS-TC layer, and vice versa.

Figure 1:
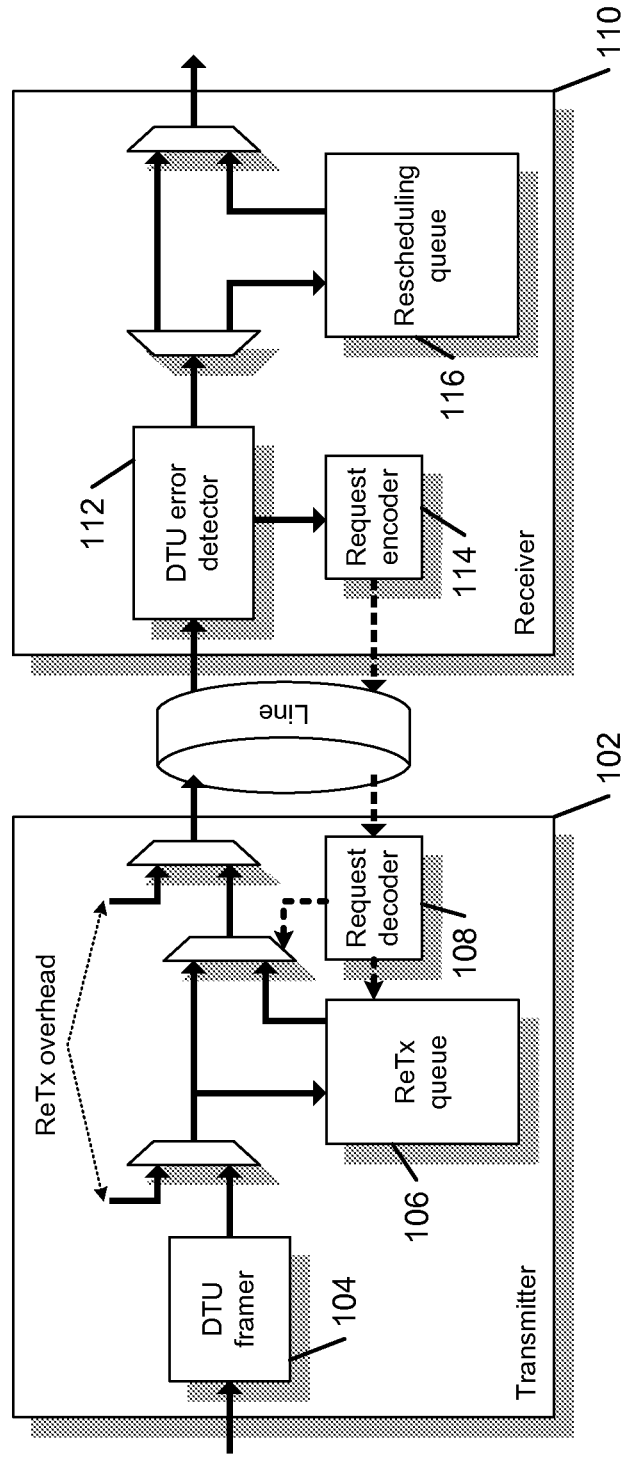
FIG. 1 illustrates an exemplary embodiment of retransmission scheme on a single link.

Referring now to the drawings, FIG. 1 depicts the functional block diagram of the ReTx scheme on a single link. At the transmitter 102, a DTU framer 104 constructs the elementary frames, called data transmit units (DTUs) that can be requested for retransmission. Each DTU contains some data provided by the transport protocol specific transmission convergence (TPS-TC) layer and some retransmission (ReTx) specific overhead (that is further described in the following). The content of each DTU is stored in a so-called retransmission (ReTx) queue 106 prior to be transmitted over the retransmission forward channel (RFC) represented by the solid arrow path in FIG. 1. The storage of a DTU involves storing at least the data content of the DTU but also some (or all) ReTx specific overhead bytes. The transmitter 102 also receives, request messages on a so-called retransmission return channel (RRC) represented in the thickly dashed arrow path in FIG. 1. The received request messages (also called RRC messages) contain information on which DTUs have been correctly received and which DTUs need to be retransmitted. For improved robustness while transmitted over the RCC, the request information may be coded on a specific format with a request encoder 114, and hence may need some decoding with a request decoder 108 in order to be correctly interpreted by the system.

At the receiver side 110, each DTU is checked for errors after reception at a DTU error detector 111. Then, correct DTUs are passed to a higher layer. When a DTU is corrupted, a request for retransmission is generated by a request encoder 114 and sent on the RRC. When a retransmission is in process, correctly received DTUs may need to be stored locally in a rescheduling queue 116 before being passed to higher layer. Such storage ensures a correct ordering of the data passed to the higher layer. The rescheduling queue 116 then acts as a buffer that reschedules (or resequences) DTUs received out-of-sequence.

In many solutions such as the one illustrated in FIG. 1, for the retransmission scheme to work properly, the ReTx queue 106 at the transmitter 102 and the rescheduling queue 112 must be implemented in a layer that can easily detect boundaries of each DTU for storage.

Two possible layers in which the queues may be implemented are the TPS-TC layer and the PMS-TC layer. However, the DTU may have different structures whether the scheme is implemented in the TPS-TC layer or the PMS-TC layer.

In the following, we propose a DTU structure designed such that a transmitter may implement the retransmission queue in a layer that is different than the layer in which a receiver may implement its rescheduling queue. This means a modem that performs retransmission with a queue management in the PMS-TC layer will support retransmission with a modem that performs management in the TPS-TC layer, and vice versa.

Figure 2A:
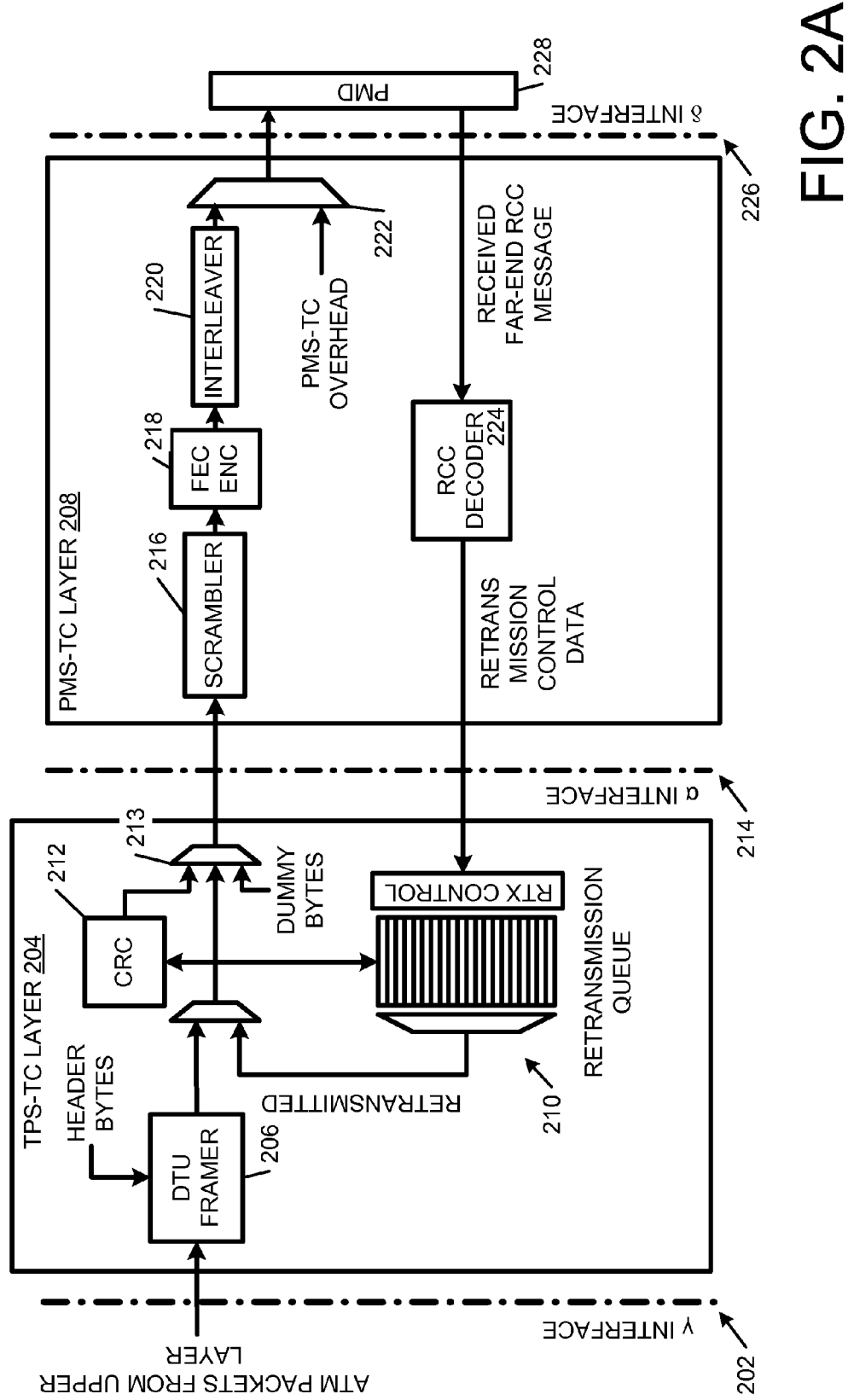
FIG. 2A illustrates a transmitter reference model for a DSL retransmission method with the retransmission queue implemented in the TPS-TC layer.

FIG. 2A illustrates a transmitter reference model for a DSL retransmission method with the retransmission queue implemented in the TPS-TC layer. As illustrated, the operations of the modem are split between the PMS-TC (physical medium specific transmission convergence) layer 208 and TPS-TC (transport protocol specific transmission convergence) layer 204.

As illustrated in the nonlimiting example of FIG. 2A, data (e.g., ATM or PTM packets) may be received from an upper layer above the gamma interface 202. The selected data may then be sent across a gamma (γ) interface 202 and received at the TPS-TC layer 204 at a DTU framer component 206. The DTU framer component 206 reformats the received data into one or more DTUs. The DTU framer component 206 can also receive header bytes to be added in each DTU, where header bytes may contain sequence identification (SID) and/or time stamp information. The data may then be sent to a cyclic redundancy check (CRC) calculation component 212, a retransmission queue 210 and a multiplexor 213. The CRC component 212 computes a CRC that can be inserted in the DTU to help the receiver side improve error detection in the received data. The CRC may be inserted in the DTU upon request from a receiver side (e.g., at initialization time). The data sent to the retransmission queue 210 can be stored for retransmission. The multiplexor 213 may multiplex together the DTU framer 206 output data with the computed CRC from the CRC component 212, and some dummy bytes (for padding). Then the multiplexor 213 sends the multiplexed data across an alpha (α) to the PMS-TC layer 208.

The data may then be sent across an alpha (a) interface 214 to the PMS-TC layer 208 at a scrambler component 216. The scrambler component 216 can scramble the received data and send the scrambled data to a forward error correction (FEC) encoder 218. The FEC encoder 218 can encode the scrambled data and send the encoded data to an interleaver 220, which sends the data to a multiplexor 222. The multiplexor 222 multiplexes the data from the interleaver 220 with PMS-TC overhead data. The multiplexor 222 sends the multiplexed data across a delta (δ) interface 226 to a PMD layer 228 and on to a receiver side.

Also illustrated in FIG. 2A, is a retransmission control channel (RCC) decoder 224. More specifically, if a corrupted DTU is determined at the receiver, the receiver can send a DTU status message to the RCC decoder 224. The status message may be encoded to improve its robustness to interference when transmitted over the line. The RCC decoder 224 decodes the status messages received from the receiver, where the decoding process involves verifying the correctness of received message and extracting retransmission control data (e.g., which DTU need retransmission) from the message. Then the RCC decoder 224 sends retransmission control data across the alpha layer 214 to the retransmission queue 210 to facilitate retransmission of the data.

Figure 2B:
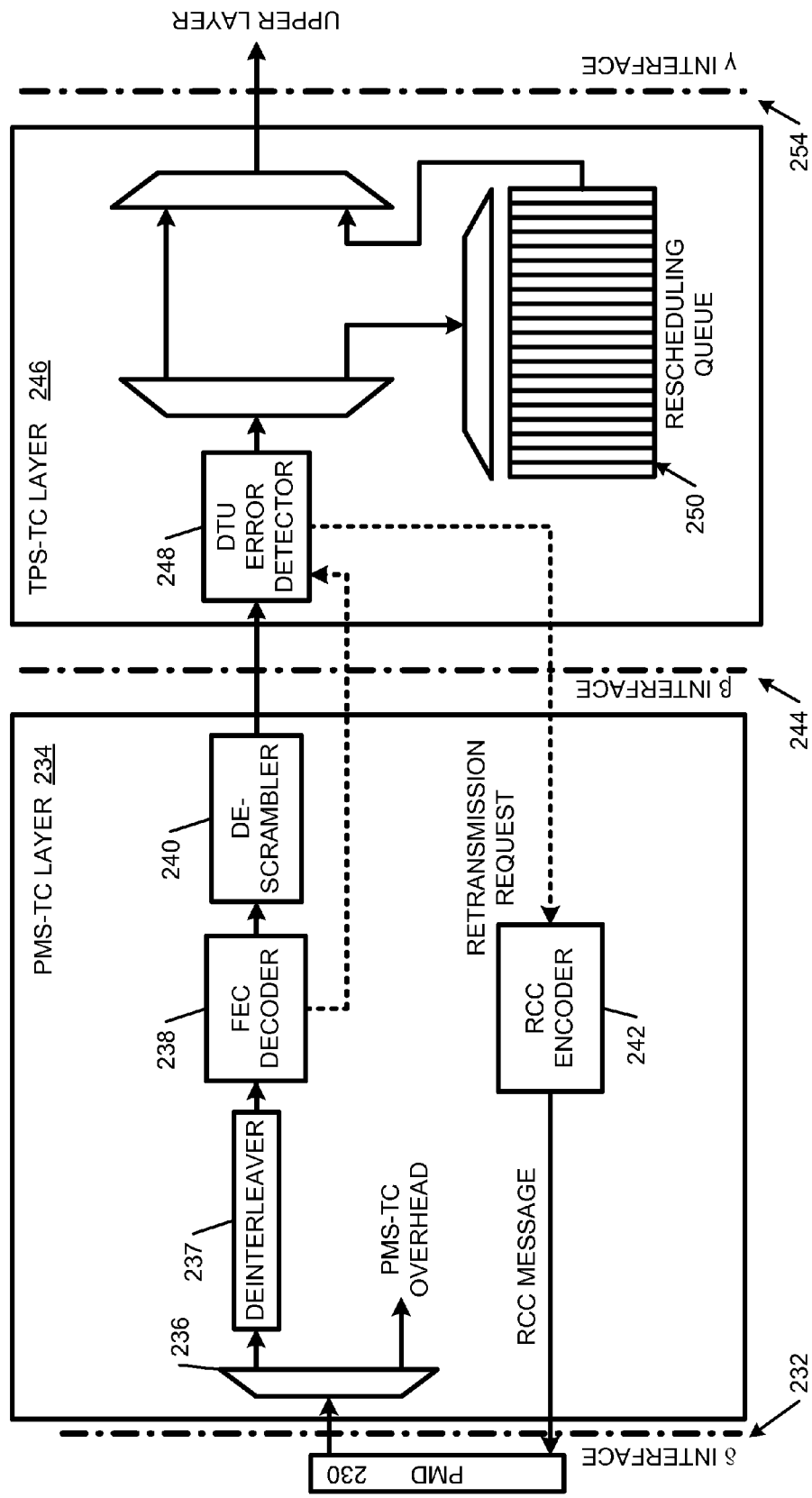
FIG. 2B illustrates a receiver reference model for a DSL retransmission method, with a rescheduling queue implemented in the TPS-TC layer.

FIG. 2B illustrates a receiver reference model for a DSL retransmission method, with a rescheduling queue implemented in the TPS-TC layer. As illustrated, the data from FIG. 2A may be received from a PMD layer 230, across a delta interface 232 at a PMS-TC layer 234 on a receiver side. The data may be received at a demultiplexor 236, which may separate overhead data from payload data. The payload data may be sent to a deinterleaver 237, which deinterleaves the data and forwards the data to a FEC decoder 238. The FEC decoder decodes the payload data and determines whether there are uncorrectable errors in the data. If so, an indication that the FEC codeword contains incorrect data may be sent directly to a DTU error detector 248 on a TPS-TC layer 246. The FEC decoder output data is then sent to a descrambler 240, which descrambles the data and sends the descrambled data across a beta (β) interface 244 to the DTU error detector 248.

The DTU error detector 248 can determine if there are any errors in the received DTUs. Error detection can be done based on information received from the FEC decoder 238, and/or via checking the CRC (if any) embedded in the DTU's padding bytes. If the receiver side has the ability to check the CRC in the error detector 248, the receiver may request (to the transmitter side) insertion of a CRC in the DTU. If an error is detected in the DTU, the DTU error detector 248 sends a retransmission request for that particular DTU to a RCC encoder 242. The RCC encoder 242 creates an RCC message, which is sent back to the transmitter, as described in reference to FIG. 2A or FIG. 3A. If no error is detected, the DTU error detector 248 sends an acknowledgment for that particular DTU to a RCC encoder 242, then sends the data to a rescheduling queue 250, and on to an upper layer, across a gamma interface 254.

Figure 3A:
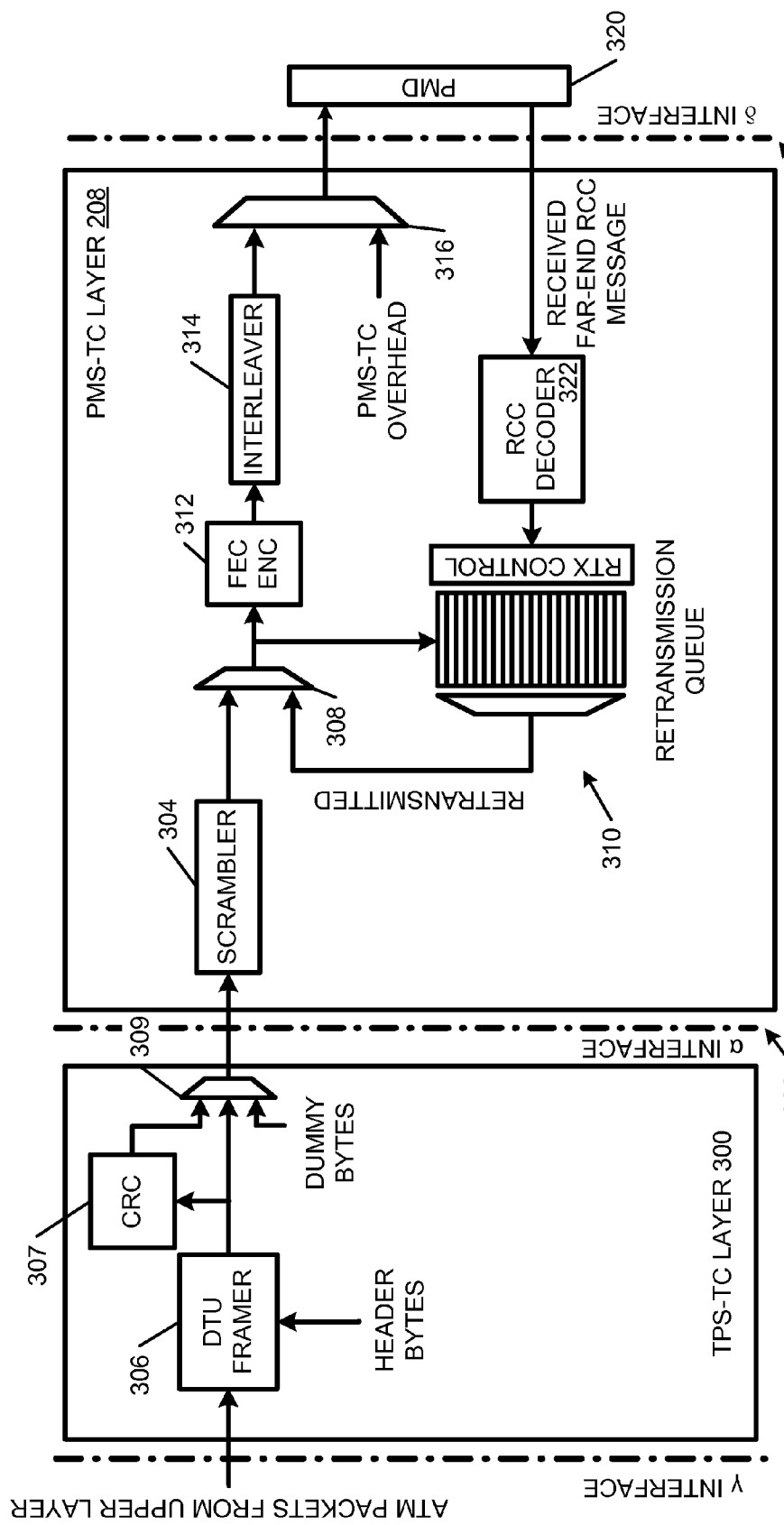
FIG. 3A illustrates a transmitter reference model for a DSL retransmission method with the retransmission queue implemented in the PMS-TC layer.

FIG. 3A illustrates a transmitter reference model for a DSL retransmission method with the retransmission queue implemented in the PMS-TC layer. As illustrated in FIG. 3A, data may be sent from across a gamma interface to a DTU framer component 306 in a TPS-TC layer 300. The DTU framer component 306 can also receive header bytes and frame the received data and header bytes into one or more DTUs. Header bytes may contain sequence identification (SID) and/or time stamp information for each DTU. The data may then be sent to a cyclic redundancy check (CRC) calculation component 307 and a multiplexor 309. The CRC component 307 computes a CRC that can be inserted in the DTU to improve error detection in the received data at a receiver side. The CRC may be inserted in the DTU upon request from a receiver side (e.g., at initialization time). The output data from the DTU framer 306 may be multiplexed in the multiplexer device 309 with the output of the CRC component 307 and some dummy bytes for padding. Output data from the multiplexor 309 may be sent across an alpha (a) interface 302 to a scrambler component 304 on a PMS-TC layer 208. The scrambler component 304 can scramble the received data and send the scrambled data to a retransmission queue 310 for storage. Additionally, the DTUs (as well as retransmitted DTUs) may be sent to a FEC encoder 312 for encoding. The encoded data may be sent to an interleaver 314. A multiplexor 316 may multiplex data and PMS-TC overhead data for sending across a delta interface 318 to a PMD layer, and on to a receiver.

Also illustrated in FIG. 3A, the PMD layer 320 can also receive a far-end RCC message for retransmission. This message may be sent to a RCC decoder 322, which formats the request to facilitate retransmission of the data at the retransmission queue 310.

Figure 3B:
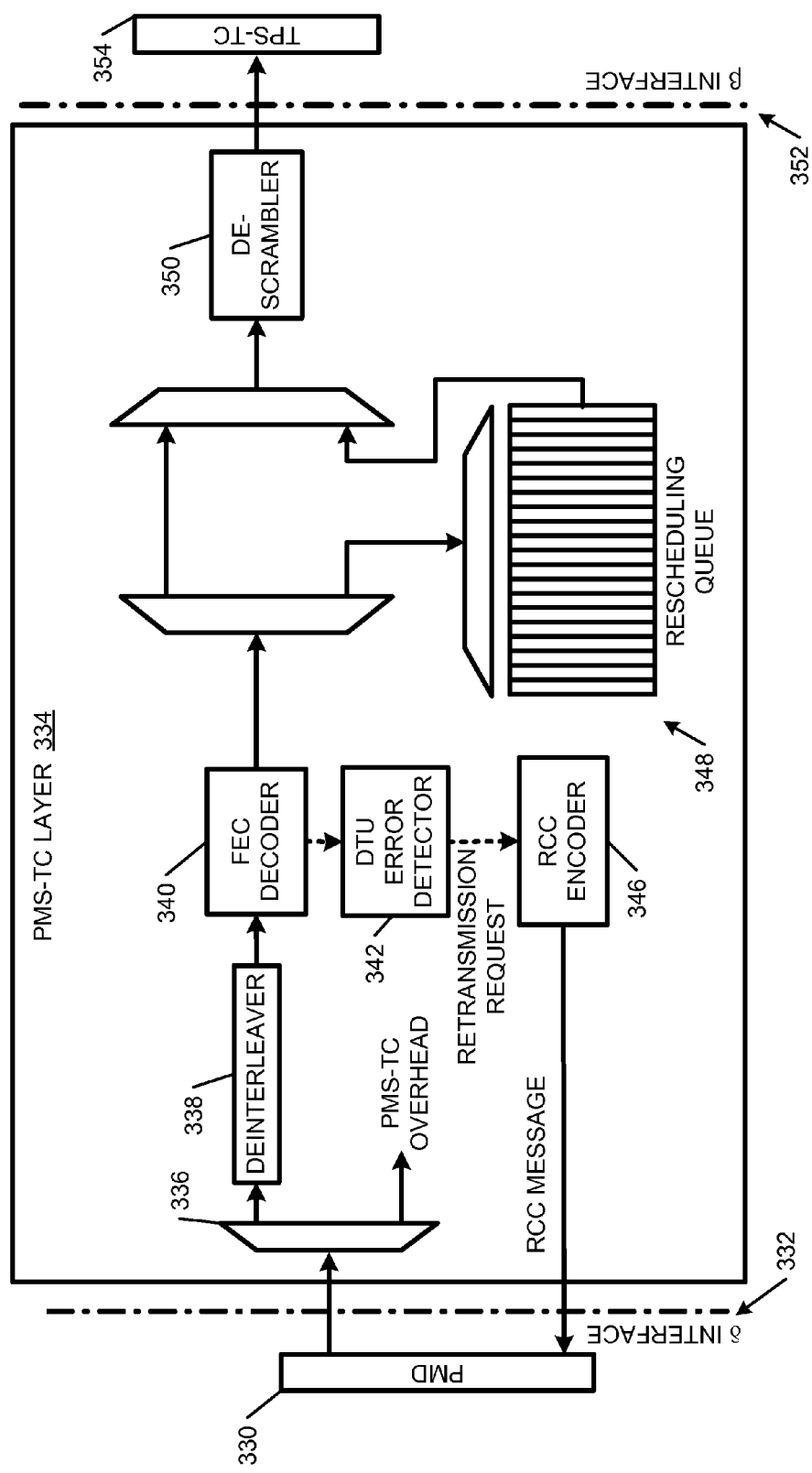
FIG. 3B illustrates a receiver reference model of a DSL retransmission method with a rescheduling queue implemented in the PMS-TC layer.

FIG. 3B illustrates a receiver reference model of a DSL retransmission method with a rescheduling queue implemented in the PMS-TC layer. As illustrated, a PMD layer 330 at a receiver can receive data and send the received data across a delta interface 332, to a demultiplexor 336 on a PMS-TC layer 334. The demultiplexor 336 can separate the PMS-TC overhead data from the DTUs. The DTUs can be sent to a deinterleaver 338, which deinterleaves the data and sends the data to an FEC decoder 340. The FEC decoder 340 can then either detect FEC codeword errors in the received data, or correct errors in the received data, or perform a combination of both error detection and correction. Information regarding detection of erroneous FEC codeword is sent to a DTU error detector 342.

The DTU error detector 342 can determine whether there are any uncorrectable errors in the DTU and, if so, send a retransmission request for the particular DTU to a RCC encoder 346. The RCC encoder 346 can send an RCC message back to the transmitter, as described in reference to FIG. 2A or FIG. 3A. If the DTU error detector 342 determines that there are no uncorrectable errors in the DTU, the FEC decoder output data is sent to a rescheduling queue 348, as well as a descrambler 350 for descrambling. The descrambled data can be sent across a beta interface 352 to a TPS-TC layer 354.

Figure 4A:
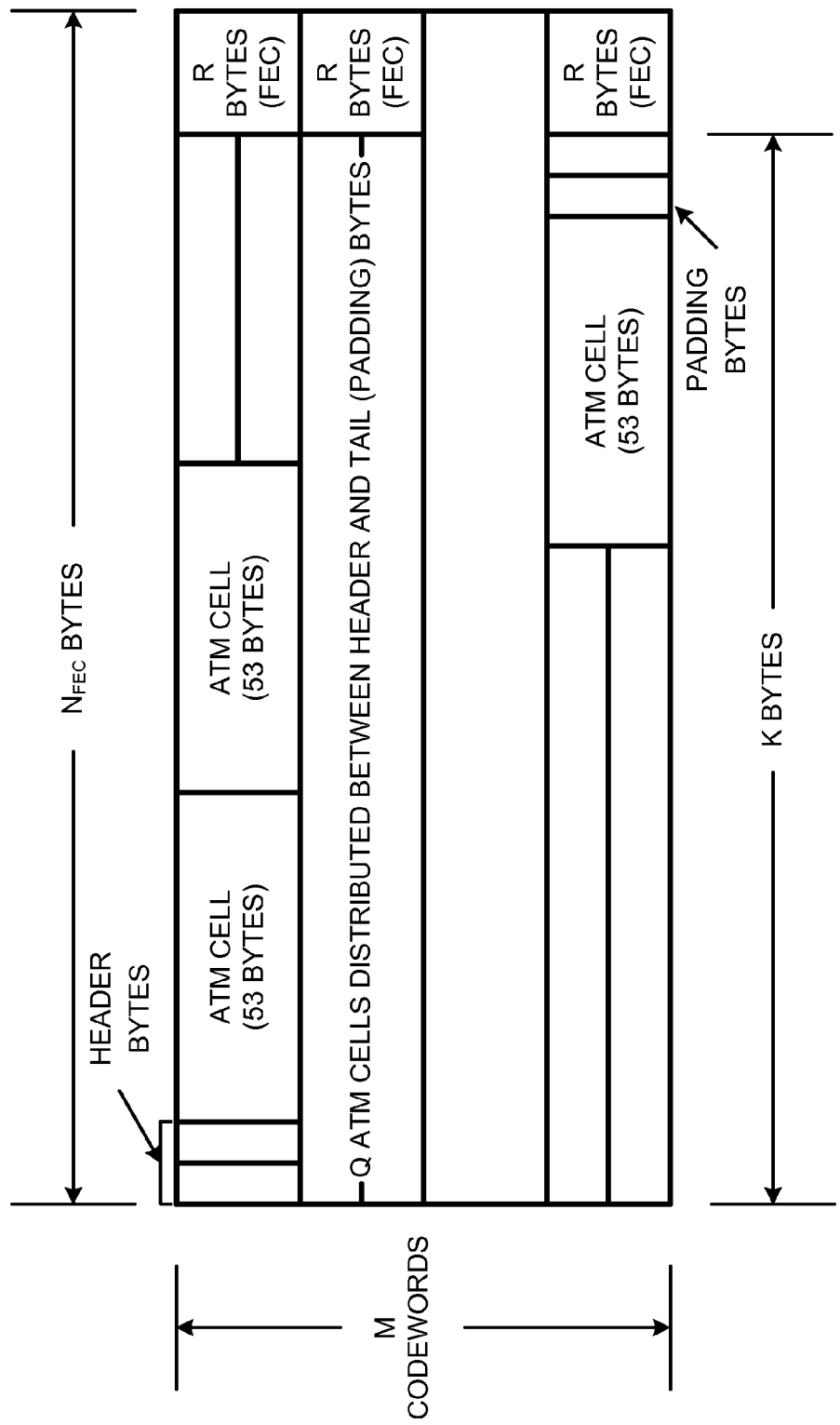
FIG. 4A illustrates a frame structure for transport of asynchronous transfer mode (ATM) cells for transparent retransmission management, such as may be utilized in the environment from FIGS. 2A, 2B, 3A, and 3B, where the frame structure appends padding bytes as tail bytes at the end of the frame.

FIG. 4A illustrates a DTU frame structure for transport of asynchronous transfer mode (ATM) cells for transparent retransmission management, such as may be utilized in the environment from FIGS. 2A, 2B, 3A, and 3B, where the frame structure appends padding bytes as tail bytes at the end of the frame.

The basic frame is a block formed of and integer number of FEC codewords. Furthermore, the block contains an integer number of ATM cells spread about an integer number of FEC codewords, plus two or more additional bytes to provide sequence identification, tagging (e.g., inclusion of a time stamp), error detection, etc.

In xDSL, the FEC code is a Reed-Solomon (RS) code that operates over the Galois Field GF(256). Therefore, one may also refer the DTU as an RS block, since it is formed by an integer number of RS codewords.

In each DTU, there are M FEC codewords containing $N_{fec}$ bytes each, where K bytes are the data bytes and R bytes are the redundancy bytes.

Two header bytes are defined for block identification and passing of a time stamp. Specifically, the first byte may define a Sequence Identifier (SID) and the second byte may be used for passing of a time stamp (TS).

Padding bytes may also be included and defined for improved granularity (fitting an integer number of ATM cells into an integer number of FEC codewords) and/or error detection of the data bytes within the DTU. While the padding bytes may be implemented as tail bytes, at the end of an ATM cell, this is a nonlimiting example, as the padding bytes may resided at other places within the DTU frame structure.

Spread throughout the data fields in the block of FEC codewords are Q ATM cells. Each Block contains M FEC codewords, where each FEC codeword contains K data bytes and R redundancy bytes.

In one possible configuration, the first ATM cell boundary immediately follows two header bytes. Similarly, in the last codeword of each DTU, the last ATM cell is adjacent to the first padding byte.

Figure 4B:
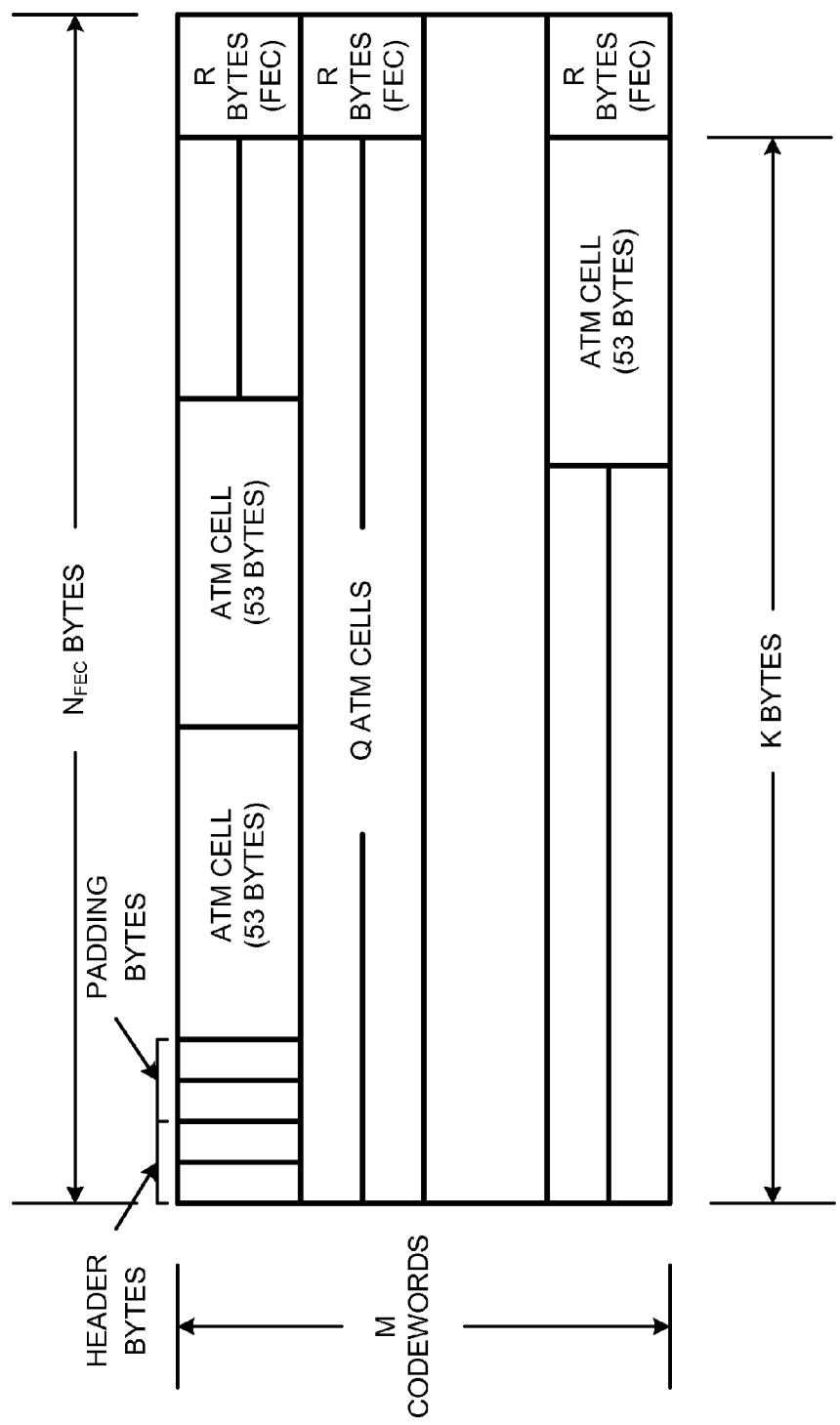
FIG. 4B illustrates a frame structure for transport of asynchronous transfer mode (ATM) cells for transparent retransmission management, such as may be utilized in the environment from FIGS. 2A, 2B, 3A, and 3B, where the frame structure appends padding bytes at the beginning of the frame, after the header bytes.

Other configurations may operate with the padding bytes in a different location, such as between the header bytes and the first AMT cell, as depicted in FIG. 4B.

Additionally, one or more padding bytes may be defined for error detection of the data bytes within the DTU.

The following equations define the number of bytes in the frame:

In each DTU, there are $M \cdot K = N_{header} + Q \cdot 53 + N_{padding}$ bytes.

The total number of bytes in a DTU is $M \cdot N_{fec} = M \cdot K + M \cdot R$.

Substituting the above two equations gives $$M \cdot N_{fec} = N_{header} + Q \cdot 53 + N_{padding} + M \cdot R \text{ bytes.}$$

The DTUs are transmitted at the line rate $R_{line}$ (in Mbits per second) into DMT symbols. $T_{RS}$ is the time duration (in seconds) of the FEC codeword, so $$R_{line} = \frac{8 \cdot N_{fec}}{T_{RS}}.$$

The FEC codewords are transported in DMT Symbols; $T_S$ is the DMT symbol period, so $$R_{line} = \frac{L_p}{T_S}$$

where $L_p$ is the number of bits per DMT symbol. Combining the two equations, the relation between the FEC codeword duration and the DMT Symbol period is $T_{RS}=S \cdot T_S$, where S is the number of DMT symbols per FEC codeword and $$S = \frac{8 \cdot N_{fec}}{L_p}.$$

If the retransmission and rescheduling queue management is performed in the PMS-TC layer, then the fundamental units stored in the transmitter and receiver queues can be either data blocks of M·K bytes each, or blocks of M·(K+R) bytes each if storing the FEC redundancy.

If the retransmission and rescheduling queue management is performed in the TPS-TC layer, then the fundamental units stored in the transmitter and receiver retransmission queues can be data blocks each formed of Q ATM cells. Header and padding bytes may not need to be stored in the retransmission and rescheduling queues.

The padding bytes may contain a CRC that spans all of the M·K data bytes in the DTU. By doing this, the system continues having a CRC on the data stream, as it exists in current xDSL solutions for the sake of keeping the ability to detect errors on the data stream. However, while in current legacy xDSL systems, the CRC may be located at the superframe level, in this embodiment, the CRC is located precisely at the DTU level.

The above CRC counts can be used as a primitive to compute erred seconds and severely erred seconds, which are metrics typically used for monitoring the quality of transmission The following is an example configuration: Q=10 ATM Cells per FEC codeword block; M=3 codeword per FEC codeword block; $N_{header}$=2 bytes: the first byte for SID and the second byte for a TAG (e.g. time stamp); $N_{padding}$=2 bytes for a 16 bit CRC; R=16 bytes for FEC code redundancy; M·K=2+10×53+2=534 data bytes per FEC codeword block; K=178 bytes in each FEC codeword.

Note that the padding bytes may contain additional dummy bytes when M·K≠$N_{header}$+Q·53+$N_{crc}$ where $N_{crc}$ is the number of CRC bytes in the DTU. This helps to align the Q ATM cells with M FEC codewords.

At the transmitter, a scrambler device is used between the TPS-TC layer and the PMS-TC layer. The scrambler is reset at the beginning of each DTU frame.

At the receiver, a descrambler device is used between the PMS-TC layer and the TPS-TC layer. The descrambler is reset at the beginning of each DTU frame.

The retransmission control channel (RCC) may be implemented such that a message is sent from the receiver to the transmitter within each DMT symbol. The messages would provide an indication of the correctly and incorrectly received DTUs.

FIG. 4B illustrates a frame structure for transport of asynchronous transfer mode (ATM) cells for transparent retransmission management, such as may be utilized in the environment from FIGS. 2A, 2B, 3A, and 3B, where the frame structure appends padding bytes at the beginning of the frame, after the header bytes. As illustrated in the nonlimiting example of FIG. 4B, the padding bytes need not be located at the end of the frame structure. In at least one exemplary embodiment, the padding bytes may be located between the header bytes and the first ATM cell (53 bytes). Other embodiments are also contemplated.

Figure 4C:
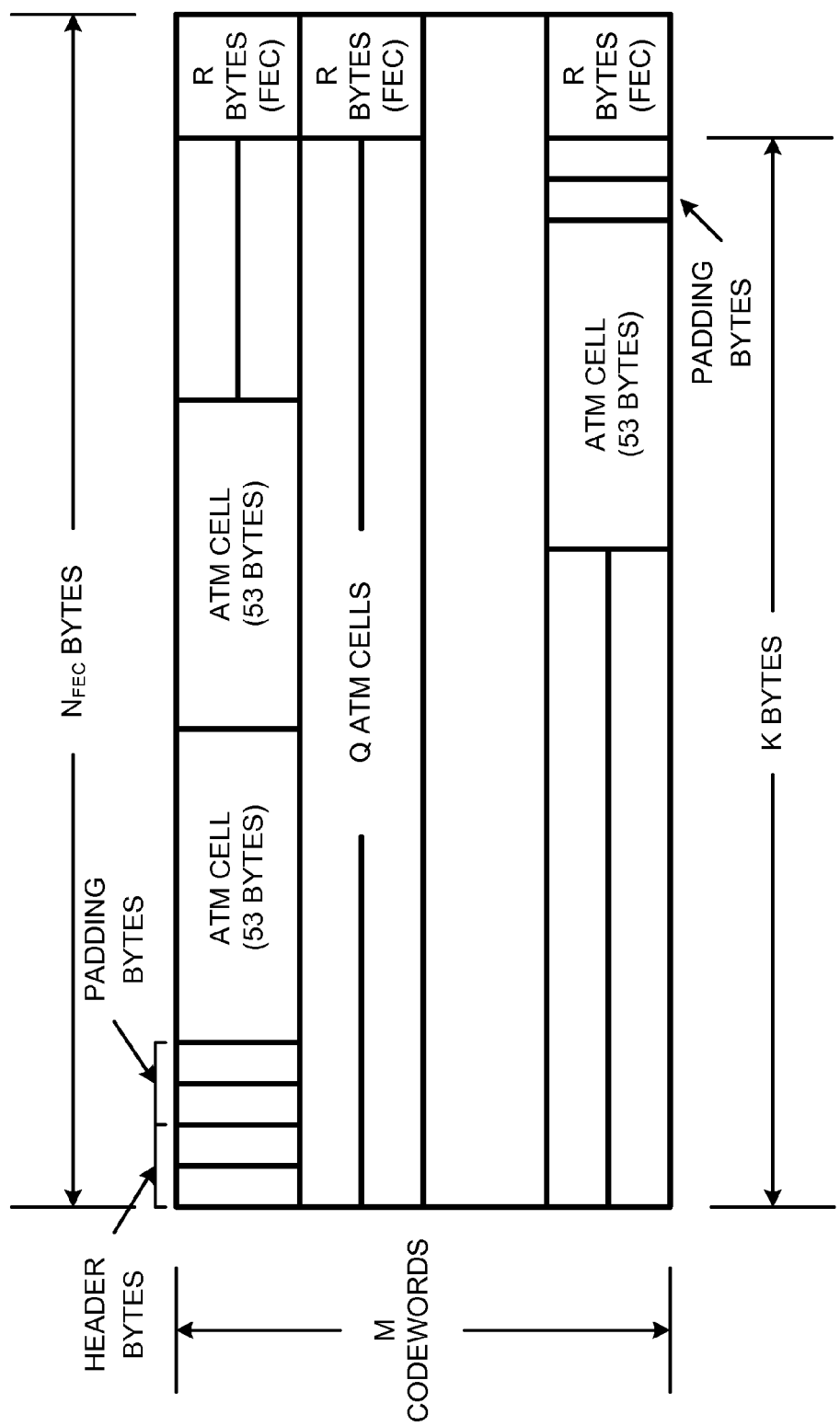
FIG. 4C illustrates a frame structure for transport of asynchronous transfer mode (ATM) cells for transparent retransmission management, such as may be utilized in the environment from FIGS. 2A, 2B, 3A, and 3B, where the frame structure appends padding bytes at both the beginning and end of the frame, after the header bytes.

FIG. 4C illustrates a frame structure for transport of asynchronous transfer mode (ATM) cells for transparent retransmission management, such as may be utilized in the environment from FIGS. 2A, 2B, 3A, and 3B, where the frame structure appends padding bytes at both the beginning and end of the frame, after the header bytes. In at least one exemplary embodiment, the padding bytes may be separated into two groups, the first group between the header bytes and the first ATM cell (53 bytes) and the second group as tail bytes after the last ATM cell. As a nonlimiting example, the header padding bytes may be dummy bytes, and the tail padding bytes may be used to contain a CRC. Other embodiments are also contemplated.

The 53 bytes ATM cells represented in FIGS. 4A 4B and 4C can be replaced with other size cells such as for example 65 bytes fragment of a PTM protocol.

Figure 5:
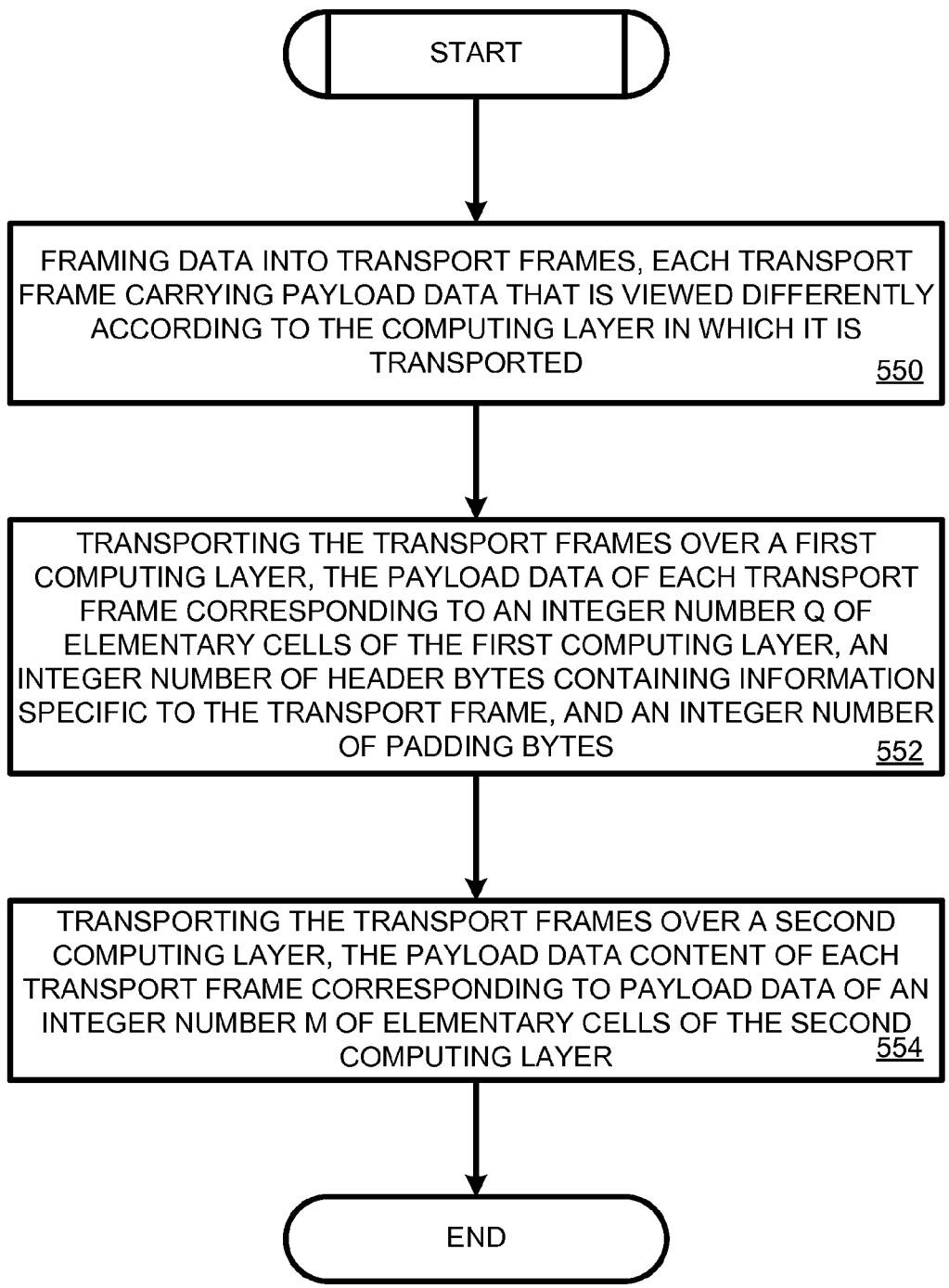
FIG. 5 illustrates an example process that may be utilized for retransmission of data between a plurality of devices.

FIG. 5 illustrates an example process that may be utilized for retransmission of data between a plurality of devices. As illustrated in the nonlimiting example of FIG. 5, data may be framed into transport frames, each transport frame carrying payload data that is viewed differently according to the computing layer in which it is transported (block 550). Additionally, the transport frames may be transported over a first computing layer, the payload data of each transport frame corresponding to an integer number Q of elementary cells of the first computing layer, an integer number of header bytes containing information specific to the transport frame, and an integer number of padding bytes (block 552). Similarly, the transport frames may be transported over a second computing layer, the payload data content of each transport frame corresponding to payload data of an integer number M of elementary cells of the second computing layer (block 554).

Further, in some embodiments, a number of padding bytes is determined such that a total number of bytes contained in the payload of the second computing layer M elementary cells equals a total number of bytes contained in the header bytes plus padding bytes plus Q elementary cells of the first computing layer.

The embodiments disclosed herein can be implemented in hardware, software, firmware, or a combination thereof. At least one embodiment disclosed herein may be implemented in software and/or firmware that is stored in a memory and that is executed by a suitable instruction execution system. If implemented in hardware, one or more of the embodiments disclosed herein can be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

One should note that the flowcharts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order and/or not at all. For example, two blocks shown in succession may in fact be executed substantially concurrently or the blocks may sometimes be executed in the reverse order, depending upon the functionality involved.

One should note that any of the programs listed herein, which can include an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

One should also note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. Further, the scope of the present disclosure is intended to cover all combinations and sub-combinations of all elements, features, and aspects discussed above. All such modifications and variations are intended to be included herein within the scope of this disclosure.

Therefore, at least the following is claimed:

1. A method for retransmission comprising:
    framing data into transport frames, each transport frame carrying payload data;
    transporting the transport frames over a first computing layer, the payload data of each transport frame corresponding to an integer number Q of elementary cells of the first computing layer, an integer number of header bytes containing information specific to the transport frame, and an integer number of padding bytes; and
    transporting the transport frames over a second computing layer different from the first computing layer, the payload data content of each transport frame corresponding to payload data of an integer number M of elementary cells of the second computing layer,
    wherein a number of padding bytes is determined such that a total number of bytes contained in the payload of the second computing layer M elementary cells equals a total number of bytes contained in the header bytes plus padding bytes plus Q elementary cells of the first computing layer.

2. The method of claim 1, wherein the elementary cell of the first computing layer is an asynchronous transfer mode (ATM) cell containing 53 bytes.

3. The method of claim 1, wherein the elementary cell of the first computing layer is a 65 bytes fragment from a packet transfer mode (PTM) protocol.

4. The method of claim 1, wherein the second computing layer elementary cell is a forward error correction (FEC) codeword, formed by payload and redundancy bytes, wherein the redundancy bytes are generated from the payload bytes of a common cell.

5. The method of claim 1, wherein payload data in the second computing layer is a scrambled version of the payload data in the first computing layer.

6. The method of claim 1, wherein padding bytes contain one or more dummy bytes, wherein the dummy bytes carry no useful information.

7. The method of claim 1, wherein padding bytes contain one or more non-dummy bytes, wherein the non-dummy bytes carry information that is useful at at least one of the following: a transmitter side and a receiver side.

8. The method of claim 7, wherein the non-dummy padding bytes contain one or more bytes configured for facilitating detection of erroneous frames.

9. The method of claim 8, wherein the bytes configured for facilitating detection of erroneous frames contain cyclic redundancy check (CRC) information.

10. The method of claim 1, wherein M and Q are different integer numbers from each other.

11. A system for retransmission, comprising:
    a transmitter side device that includes:
    a first computing layer configured to transport first layer transport frames, the first layer transport fames including payload data, the payload data of each transport frame corresponding to an integer number Q of elementary cells of the first computing layer, an integer number of header bytes containing information specific to the transport frame, and an integer number of padding bytes, and
    a second computing layer different from the first computing layer, the second computing layer configured to transport second format transport frames, the payload data content of each second format transport frame corresponding to an integer number M of elementary cells of the second computing layer,
    wherein a number of padding bytes is determined such that the total number of bytes contained in the payload of the second computing layer M elementary cells equals the total number of bytes contained in the header bytes plus padding bytes plus Q elementary cells of the first computing layer.

12. The system of claim 11, wherein padding bytes contain one or more dummy bytes, wherein the dummy bytes carry no useful information.

13. The system of claim 11, wherein padding bytes contain one or more non-dummy bytes, wherein the non-dummy bytes carry information that is useful at at least one of the following: a transmitter side and a receiver side.

14. The system of claim 11, wherein the transport frame structure includes one or more padding bytes configured for facilitating detection of erroneous frames.

15. The system of claim 14, wherein the bytes configured for facilitating detection of erroneous frames carrying cyclic redundancy check (CRC) information.

16. The system of claim 11, wherein a number, location in the transport frame, and type of padding bytes is at least partially indicated by a receiver side.

17. The system of claim 11, wherein M and Q are different integer numbers from each other.

18. A system for retransmission, comprising:
   a receiver side device that includes a data receiving component configured to receive data from a transmitter side device, the data including one or more retransmission transport frame structures being received over a second computing layer, then over a first computing layer different from the second computing layer,
   wherein on the second computing layer, payload data of the transport frame corresponds to an integer number M of elementary cells of the second computing layer,
   wherein on the first computing layer, the payload data of the transport frame corresponds to an integer number Q of elementary cells of the first computing layer, an integer number of header bytes containing information specific to the transport frame, and an integer number of padding bytes, and
   wherein a number of padding bytes is determined such that a total number of bytes contained in the payload of the second computing layer M elementary cells equals the total number of bytes contained in the header bytes plus padding bytes plus Q elementary cells of the first computing layer.

19. The system of claim 18, wherein padding bytes contain one or more non-dummy bytes, wherein the non-dummy bytes carry information that is used by the receiver.

20. The system of claim 18, wherein the transport frame structure includes one or more padding bytes configured for facilitating error detection.

21. The system of claim 20, wherein the bytes configured for facilitating detection of erroneous frames carrying cyclic redundancy check (CRC) information.

22. The system of claim 18, wherein a number, location in the transport frame, and type of padding bytes to insert in each transport frame are at least partially indicated to a transmitter side.

23. The system of claim 18, wherein M and Q are different integer numbers from each other.

* * * * *

UNITED STATES PATENT AND TRADEMARK OFFICE
CERTIFICATE OF CORRECTION

PATENT NO. : 8,463,955 B2  
APPLICATION NO. : 12/645753  
DATED : June 11, 2013  
INVENTOR(S) : Pons et al.

Page 1 of 1

It is certified that error appears in the above-identified patent and that said Letters Patent is hereby corrected as shown below:

In the Specification

In Column 2, Line 2, delete "transport fames" and insert -- transport frames --, therefor.

In Column 2, Line 10, delete "layer," and insert -- layer. --, therefor.

In Column 3, Line 35, delete "detector 111." and insert -- detector 112. --, therefor.

In Column 3, Line 48, delete "queue 112" and insert -- queue 116 --, therefor.

In Column 7, Lines 39-40, delete "transmission" and insert -- transmission. --, therefor.

In Column 8, Line 20, delete "4A 4B" and insert -- 4A, 4B --, therefor.

In the Claims

In Column 10, Line 42, in Claim 11, delete "transport fames" and insert -- transport frames --, therefor.

Signed and Sealed this  
First Day of October, 2013

Teresa Stanek Rea  
*Deputy Director of the United States Patent and Trademark Office*